(12) United States Patent
Chung

(10) Patent No.: US 6,753,892 B2
(45) Date of Patent: Jun. 22, 2004

(54) METHOD AND DATA PROCESSING SYSTEM FOR PRESENTING ITEMS IN A MENU

(75) Inventor: Dae-Suk Chung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 09/725,996

(22) Filed: Nov. 29, 2000

(65) Prior Publication Data

US 2002/0063738 A1 May 30, 2002

(51) Int. Cl.$^7$ .................................................. G06F 3/14
(52) U.S. Cl. ..................................... 345/810; 345/839
(58) Field of Search ................................. 345/764, 784, 345/839, 848, 854, 810, 133, 145, 156, 174, 152

(56) References Cited

U.S. PATENT DOCUMENTS

| | | |
|---|---|---|
| 4,862,390 A | 8/1989 | Weiner |
| 5,054,774 A | 10/1991 | Belsito |
| 5,422,521 A | 6/1995 | Neer et al. |
| 5,774,540 A | 6/1998 | Davidson et al. |
| 5,786,819 A | 7/1998 | Weiser et al. |
| 6,259,432 B1 * | 7/2001 | Yamada et al. .............. 345/159 |
| 6,295,061 B1 * | 9/2001 | Park et al. .................... 345/835 |
| 6,369,837 B1 * | 4/2002 | Schirmer ..................... 345/764 |

FOREIGN PATENT DOCUMENTS

| | | |
|---|---|---|
| JP | 2247721 | 10/1990 |
| JP | 10290275 | 10/1998 |

* cited by examiner

Primary Examiner—Cao (Kevin) Nguyen
(74) Attorney, Agent, or Firm—Duke W. Yee; Jeffrey S. LaBaw; Stephen R. Tkacs

(57) ABSTRACT

A method, apparatus, and computer implemented instructions for presenting a menu and a plurality of items associated with the menu. Displayed items are presented within the menu. The displayed items are part of the plurality of items associated with the menu. A graphical indicator is displayed in association with the menu. Items are displayed within the menu to show undisplayed items within the plurality of items in response to a selected user input to a pointing device.

37 Claims, 5 Drawing Sheets

METHOD AND DATA PROCESSING SYSTEM FOR PRESENTING ITEMS IN A MENU

BACKGROUND OF THE INVENTION

1. Technical Field

The present invention relates generally to an improved data processing system, and in particular to a method and apparatus for an improved graphical user interface for a data processing system. Still more particularly, the present invention provides a method and apparatus for displaying items in a menu.

2. Description of Related Art

With today's data processing systems, graphical user interfaces (GUIs) using windows are commonplace. Each window represents a workspace or an application that is currently open or executing on a data processing system. Within a window, a user may select and execute functions upon data within the window. This manipulation of data within a window is achieved through a pointer controlled by a pointing device. The pointing device may take various forms, such as a mouse, trackball, light pen, touchscreen, touchpad, and a keyboard. Through the pointing device, the pointer is moved on the screen and various graphical objects may be manipulated. The pointer contains a hot spot, which is a portion of the pointer that may actually manipulate graphical objects within the GUI.

For example, various functions, such as copy, cut, paste, and save, may be accessed by selecting a menu using a pointer. These menus may take various forms, such as a pull-down menu, which is displayed when the menu is selected from a menu bar. This menu bar is typically located at the top of a window. Menus also may take the form of a popup menu, which is displayed when a particular user input is received, such as the selection or depressing of a right mouse button. Oftentimes, these menus may contain long lists of items. These items may be user-selected or defined.

With long lists of items, the menu becomes aesthetically unpleasing and oftentimes cannot be displayed within a single menu. One solution is a ruler type solution in which arrows are present in the menu. One arrow may be selected to display items in which the items are pulled downward, while another arrow may be selected to display items in which the items are pulled upward. When items are pulled upward or downward undisplayed items become displayed. With this type of menu, additional items are displayed, using up more display space on the screen.

Another solution involves extending the display of the menu to the left or right side of the current menu display. The extension in this type of solution is based on which side of the menu has larger amounts of free space for display of items. The disadvantage of this approach is that the display area within the screen becomes covered by a large menu list. Yet another solution involves scrolling items in a window in a linear manner up and down using scroll bars. This solution requires additional user input to manipulate the scroll bar and if a desired item was missed at the beginning of the list and the user is at the end of the list, the user must scroll back up the list to reach the desired item.

Therefore, it would be advantageous to have an improved method and apparatus for displaying menu items in a data processing system.

SUMMARY OF THE INVENTION

The present invention provides a method, apparatus, and computer implemented instructions for presenting a menu and a plurality of items associated with the menu. Displayed items are presented within the menu. The displayed items are part of the plurality of items associated with the menu. A graphical indicator is displayed in association with the menu. Items are displayed within the menu to show undisplayed items within the plurality of items in response to a selected user input to a pointing device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
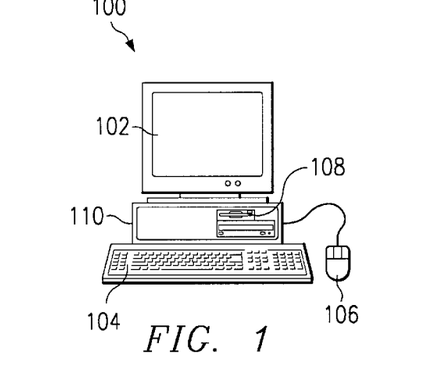
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
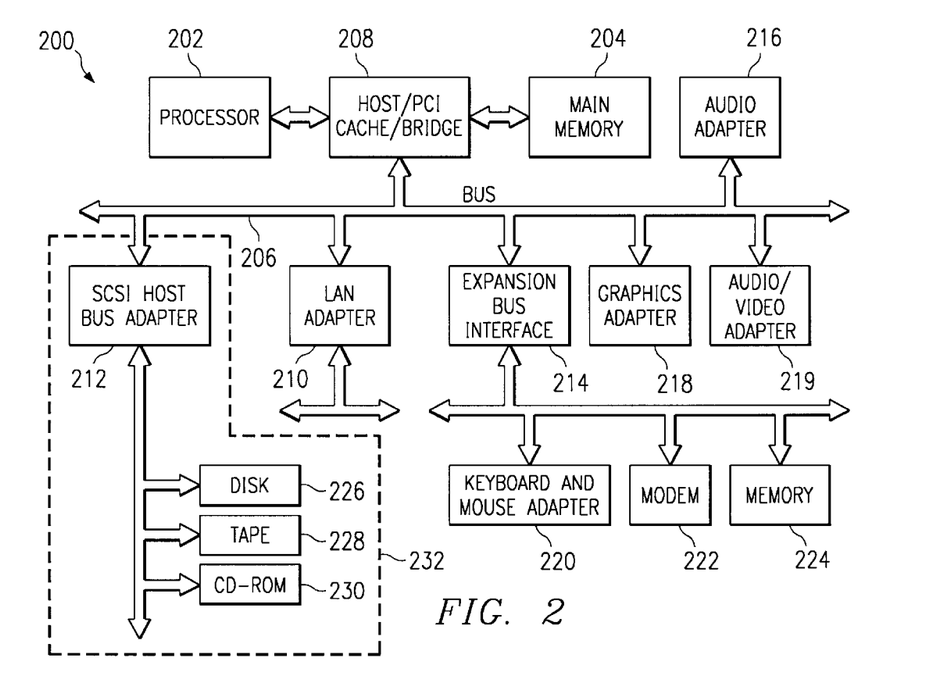
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. Java is a trademark of Sun Microsystems, Inc. Instructions for the operating system, the object-oriented programming system, and applications or programs are located on storage devices, such as hard disk driv226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention provides a method, apparatus, and computer implemented instructions for displaying items in a menu. The mechanism of the present invention provides for scrolling items in a menu such that when one item moves off the menu, another item moves onto the menu. In the depicted examples, these items may roll in a circular fashion in which items repeat rather than having the scrolling stop when reaching an end of the list. In other words, if the last item in the list is reached, then the first item is then repeated. Only a certain number of items are displayed at any one time. A graphical indicator may be used to indicate that additional items are present for viewing, but are currently undisplayed within the menu. Through a user input, such as a depressing of a right mouse button, the menu may roll or scroll items across the menu such that new items are displayed when currently displayed items are moved off the menu. The number of items displayed on a menu may be user-defined as well as the speed at which the menu list scrolls or rolls. When a desired item is viewed, another user input, such as releasing the right mouse button, may be used to stop the movement of the items. At that time, the user may select the item to activate the function or process associated with the item.

Figure 3:
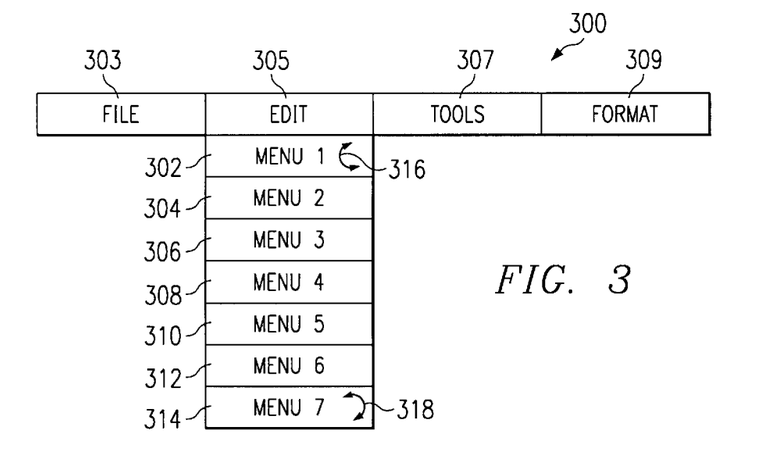
FIG. 3 is a diagram illustrating a menu in accordance with a preferred embodiment of the present invention.

With reference now to FIG. 3, a diagram illustrating a menu is depicted in accordance with a preferred embodiment of the present invention. Menu 300 includes a number of menus, File 303, Edit 305, Tools 307, and Format 309. These menus are drop down menus as can be seen with respect to Edit 305, which in this example contains items 302–314. Graphical indicators 316 and 318 are illustrated to indicate that additional menu items are present, but are currently undisplayed.

Figure 4A:
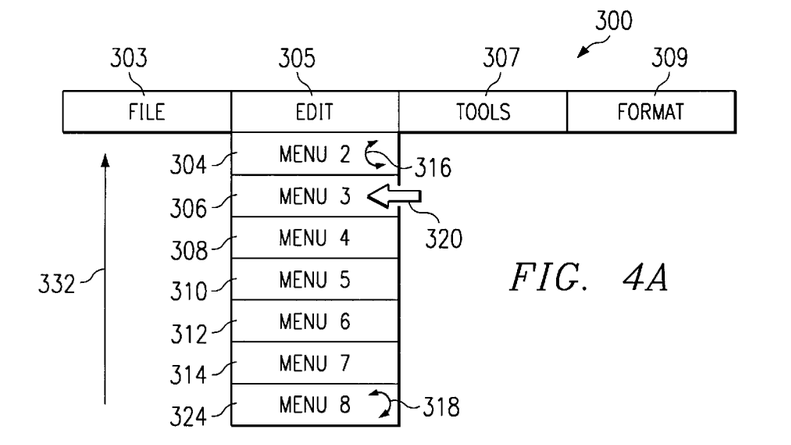
FIGS. 4A and 4B are illustrations of scrolling items displayed on a menu in accordance with a preferred embodiment of the present invention.
Figure 4B:
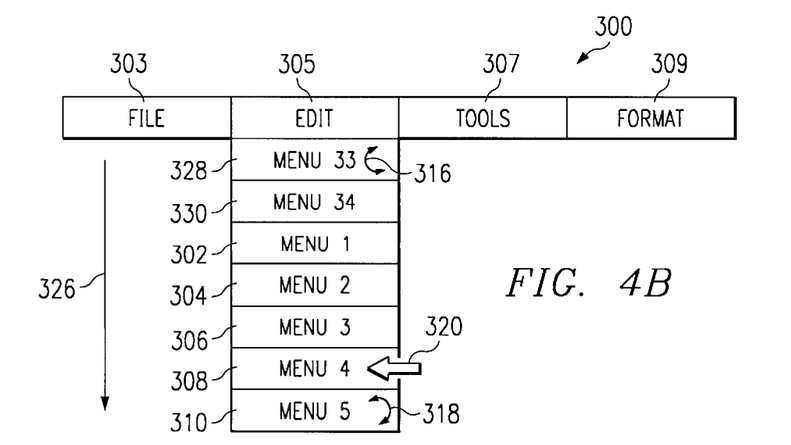

Turning now to FIGS. 4A and 4B, an illustration of scrolling items displayed on a menu is depicted in accordance with a preferred embodiment of the present invention. In these examples, identical reference numbers in different figures are used to represent identical elements.

In this example, pointer 320 is located over menu 300 in FIG. 4A. In response to a user input, such as the depressing of a right mouse button on a pointing device, such as a mouse, the menu scrolls in the direction of arrow 322. This scrolling or rolling of items in menu 300 results in item 302 from FIG. 3 disappearing from menu 300. Items 304–314 shift upwards in menu 300, and item 324 appears on menu 300. In this example, the menu items scroll upward in the direction of arrow 322 in response to pointer 320 being located in the upper half of menu 300. In FIG. 4B, pointer 320 is located in the lower half of menu 300, resulting in items scrolling downward, in the direction of arrow 326. In this example, menu items 312 and 314 have scrolled off the display within menu 300, and menu items 328 and 330 scroll onto menu 300. In these examples, scrolling occurs only when the pointer is located over the menu and when the selected user input occurs. The scrolling may occur in a linear or circular fashion in response to a particular user input. When linear scrolling occurs, a first item and a last item are present within the set of items. When the last item is reached, the first item can be seen only by scrolling the items back in the opposite direction. With circular scrolling, when the last item is reached, the first item may be seen by continuing to scroll in the same direction.

Figure 5A:
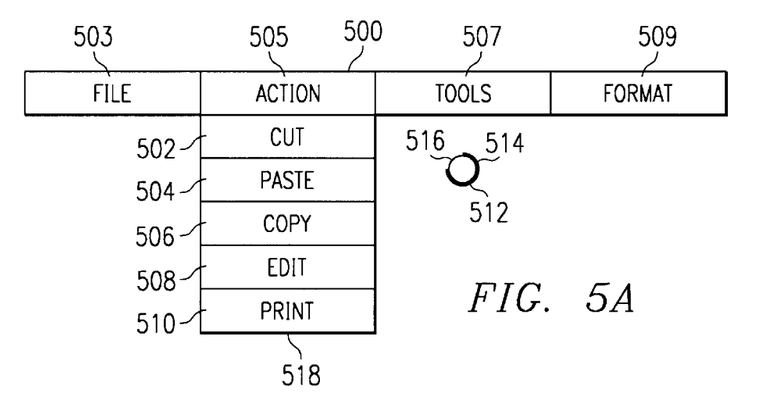
FIGS. 5A–5C are diagrams illustrating a menu in accordance with a preferred embodiment of the present invention.
Figure 5B:
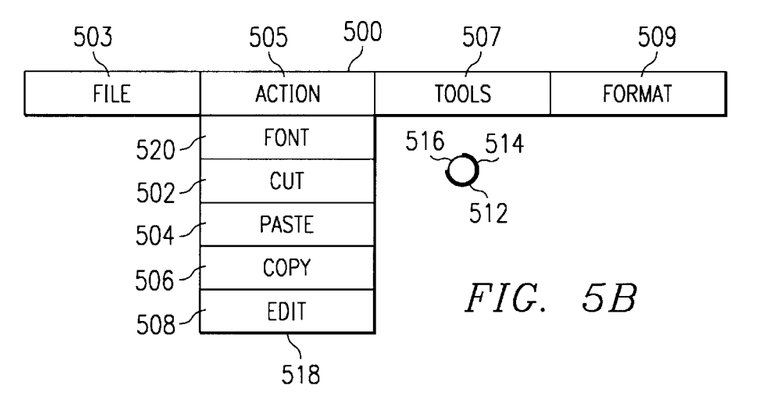
Figure 5C:
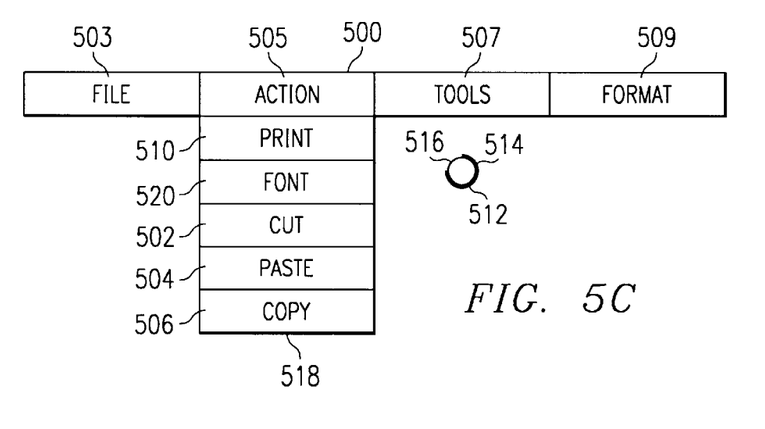

Turning next to FIGS. 5A–5C, diagrams illustrating a menu are depicted in accordance with a preferred embodiment of the present invention. In this example, menu 500 is a menu bar containing the following menus: File 503, Action 505, Tools 507, and Format 509. In this example, the menu Action 505 contains menu items 502–510 in FIG. 5A. Graphical indicator 512 is used to identify the presence of additional items that are undisplayed in menu 500. Further, graphical indicator 512 may be used to indicate if circular scrolling or circular scrolling occurs for the menu. For example, if linear scrolling is set instead of circular scrolling, a straight bar or segment may be used in place of this circular shaped graphical indicator. Additionally, graphical indicator 500 illustrates the number of items displayed relative to the number of items undisplayed. Section 514 depicts the items displayed in menu 500 relative to the items undisplayed, as indicated by section 516.

In FIG. 5B, item 510 has been scrolled off menu 500 at end 518, with items 502–508 being scrolled towards end 518. A new item, item 520 appears at end 522 of menu 500. In FIG. 5C, the items repeat as item 510 reappears within menu 500 at end 522.

In these examples, graphical indicator 512 indicates the number of items displayed relative to the number of items undisplayed. Further, graphical indicator 512 also may change or move to illustrate relative positions of displayed items to undisplayed items within menu 500.

Figure 6:
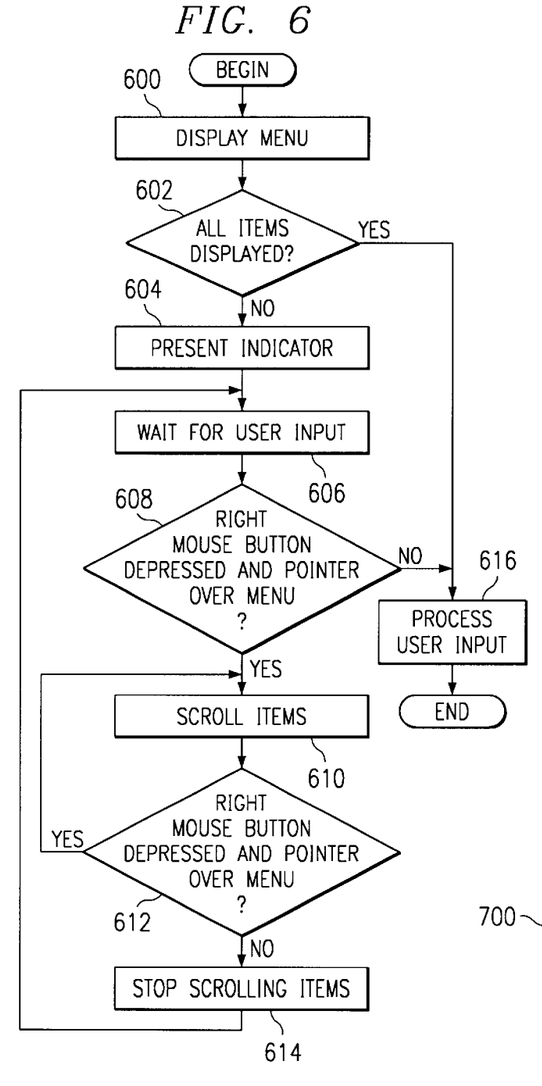
FIG. 6 is a flowchart of a process used for displaying a menu in accordance with a preferred embodiment of the present invention.

Turning next to FIG. 6, a flowchart of a process used for displaying a menu is depicted in accordance with a preferred embodiment of the present invention. The process illustrated in FIG. 6 provides the circular scrolling as depicted in FIGS. 4A–4B and FIGS. 5A–5C.

The process begins by displaying a menu (step 600). This menu contains items that may be selected to activate processes or functions in these examples. The number of items displayed in the menu may be preset or user-defined. Next, a determination is made as to whether all items associated with the menu are displayed (step 602). If all items are not displayed, an indicator is presented (step 604). This indicator is use to alert a user that additional undisplayed items are present. The process then waits for user input (step 606).

When user input is received, a determination is made as to whether the right mouse button is depressed and whether the pointer is over the menu is made (step 608). If the right mouse button is depressed and the pointer is over the menu, the items are scrolled (step 610).

Next, a determination is made as to whether the right mouse button is depressed and whether the pointer is over the menu (step 612). If both of these conditions are true, the process returns to step 610, and the process repeats itself in this fashion until the right mouse button is not depressed or the pointer is not over the menu. Turning back to step 612, when either the right mouse button is not depressed or the pointer is not located over the menu, the scrolling of the items stops (step 614) with the process then returning to step 606 to wait for user input.

With reference again to step 608, if either the right mouse button is not depressed or the pointer is not located over the menu the user input is processed (step 616) with the process terminating thereafter. In these examples, the processing of the user input may involve the activation of a process or function associated with an item in response to a user input selecting the item. The processing of the user input may, on the other hand, merely be a movement of the pointer. The process also proceeds to step 616 if all items are displayed in step 602.

Figure 7:
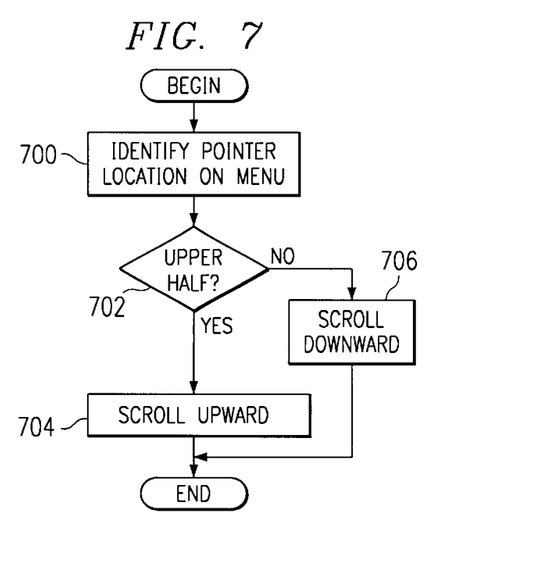
FIG. 7 is a flowchart of a process used for scrolling or rolling items displayed in a menu in accordance with a preferred embodiment of the present invention.

With reference now to FIG. 7, a flowchart of a process used for scrolling or rolling items displayed in a menu is depicted in accordance with a preferred embodiment of the present invention. The process illustrated in the FIG. 7 is a more detailed description of step 610 in FIG. 6.

The process begins by identifying the pointer location on the menu being (step 700). Next, a determination is made as to whether the pointer is located on the upper half of the menu (step 702). If the pointer is located on the upper half of the menu, the items are scrolled upward relative to the menu (step 704) with the process terminating thereafter. If, however, the pointer is not located on the upper half of the menu, the items are scrolled downward (step 706) with the process terminating thereafter.

The process of scrolling described in FIG. 7 is exemplary of the one way of scrolling items on menu. For example, the items could be scrolled horizontally rather than vertically.

Figure 8:
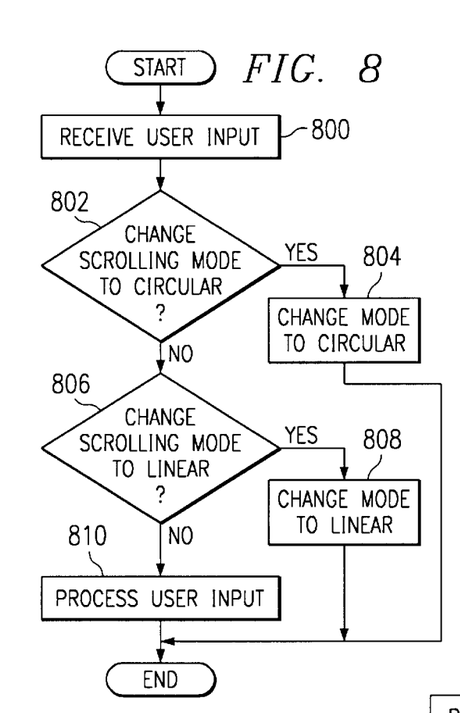
FIG. 8 is a flowchart of a process for changing scrolling modes in accordance with a preferred embodiment of the present invention.

Turning next to FIG. 8, a flowchart of a process for changing scrolling modes is depicted in accordance with a preferred embodiment of the present invention. The process begins by receiving a user input (step 800). A determination is made as to whether the user input is to change the scrolling mode to a circular scrolling mode (step 802). If the scrolling mode is to be changed to a circular one, the change is made to allow for circular scrolling (step 804), with the process terminating thereafter.

With reference again to step 802, if the scrolling mode is not to be changed to a circular one, a determination is then made as to whether the user input indicates that a linear scrolling mode is to be used (step 806). If a linear mode is to be used, the scrolling is changed to linear scrolling (step 808) with the process terminating thereafter. Otherwise, the user input is processed (step 810) with the process also terminating. The processing of user input in step 810 includes any normal processing of user input, such as selection of a menu item or movement of the pointer.

Figure 9:
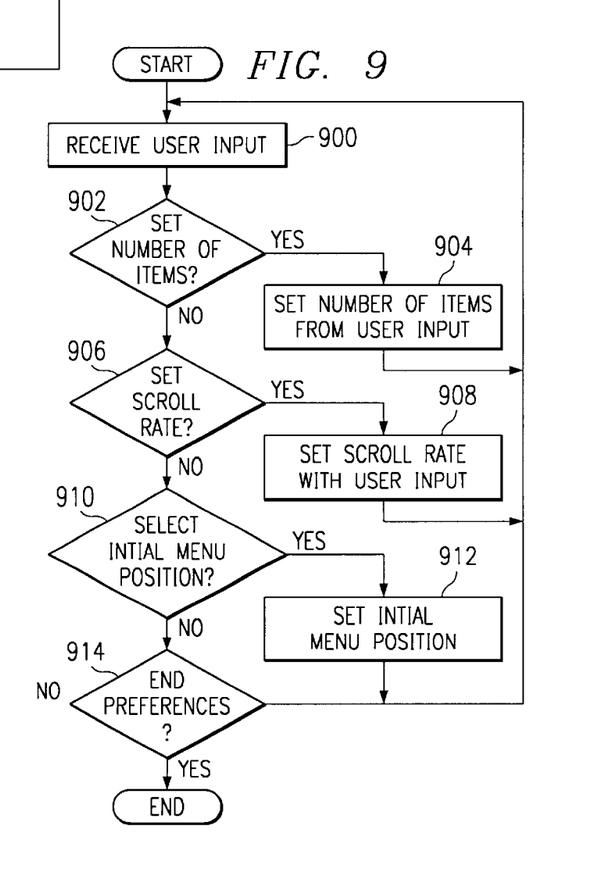
FIG. 9 is a flowchart of a process used to set user preferences for scrolling items in accordance with a preferred embodiment of the present invention.

With reference now to FIG. 9, a flowchart of a process used to set user preferences for scrolling items is depicted in accordance with a preferred embodiment of the present invention. The process begins by receiving the user input (step 900). A determination is then made as to whether the user input sets the number of items to be displayed within the menu (step 902). If the user input sets the number of items this user input is used to select the number of items that will be displayed at any one time in the menu (step 904) with the process then returning to step 900. With this parameter, a user may define the size of the menu that is to be displayed on the screen.

With reference again to step 902, if the user input does not set the number of items, a determination is made as to whether the user input contains a scroll rate (step 906). If the input sets a scroll rate, the scrolling rate at which items are moved or scrolled in the menu is set using this parameter (step 908) with the process returning to step 900. In this manner, a user may select the speed at which items scroll through the menu.

If the scroll rate is not set in step 906, a determination is made as to whether the user input selects an initial menu position (step 910). If the user input selects an initial menu position, the initial menu position is set using this input (step 912) with the process then returning to step 900. With this step, the initial menu items that are displayed within the menu may be set by the user. The user may desire to have the beginning items displayed, the items near the end displayed, or items in between displayed when the menu is initially presented.

With reference again to step 910, if the user input does not select the initial menu position, a determination is made as to whether the user input is to end setting of preferences (step 914). If the user input ends the setting of preferences, the process terminates. Otherwise, the process returns to step 900.

Thus, the present invention provides a method, apparatus, and computer implemented instructions for displaying items in menus on a graphical user interface. The mechanism of the present invention reduces the amount of screen space required to present items associated with a menu to a user. This advantage involves scrolling or rolling items onto and off of a menu that presents a selected number of items. The scrolling allows a user to view all of the selections, while reducing the amount of space need on the screen to display them.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the described embodiment scrolls the items when a selected user input is received and the pointer is located over the menu. In other embodiments of the present invention, the scrolling or rolling of the items across the menu may not require the pointer to be located over the menu. Further, the illustrated examples depict drop down menus. The mechanism of the present invention may be applied to other types of menus in which large numbers of items are present and cannot be efficiently displayed all at the same time. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for presenting a menu and a plurality of items associated with the menu, the method comprising:

presenting a plurality of displayed items within an array in the menu, wherein the displayed items are part of the plurality of items associated with the menu;

displaying a graphical indicator in association with the menu, wherein the graphical indicator is representative of which items are displayed within the array; and responsive to user input directed to the menu, scrolling items within the array wherein previously undisplayed items are displayed within the array and previously displayed items are hidden.

2. The method of claim 1, wherein the graphical indicator is a circle.

3. The method of claim 2, wherein a first portion of the circle identifies the displayed items and a second portion of the circle identifies the undisplayed items.

4. The method of claim 1, wherein the array is a linear array.

5. The method of claim 1, wherein the user input comprises input from a pointing device positioning a pointer over the array, and the pointing device is one of a mouse, keyboard, and trackball.

6. The method of claim 1, wherein the plurality of items are scrolled circularly.

7. The method of claim 1, wherein the plurality of items are scrolled linearly.

8. The method of claim 1, wherein the menu is one of a pull-down menu, a submenu, and a pop-up menu.

9. The method of claim 1, wherein whether the array is scrollable is determined by a total number of the plurality of items.

10. The method of claim 1 further comprising:

executing a process associated with an item within the plurality of items in response to selection of the item.

11. The method of claim 1, wherein the scrolling step scrolls the items in a first direction if a pointer is located in a first portion of the array and scrolls the items in a second direction is the pointer is located in a second portion of the array.

12. The method of claim 1, wherein the graphical indicator is displayed in a first state when circular scrolling occurs and is displayed in a second state when linear scrolling occurs.

13. The method of claim 1, wherein a behavior of the scrolling of the plurality of items within the array occurs is governed by user defined parameters.

14. The method of claim 13, wherein the user defined parameters include at least one of a scrolling speed, a number of displayed items, a selection of initially displayed items.

15. The method of claim 1, wherein the scrolling step includes changing between linear scrolling and circular scrolling in response to a particular user input.

16. A data processing system comprising:

a bus system;

a communications unit connected to the bus system;

a memory connected to the bus system, wherein the memory includes as set of instructions; and a processing unit connected to the bus system, wherein the processing unit executes the set of instructions to present a plurality of displayed items within an array in the menu, wherein the displayed items are part of a plurality of items associated with the menu; display a graphical indicator in association with the menu, wherein the graphical indicator is representative of which items are displayed within the array; and responsive to user input directed to the menu, scroll items within the array wherein previously undisplayed items are displayed within the array and previously displayed items are hidden.

17. The data processing system of claim 16, wherein the bus system is a single bus.

18. The data processing system of claim 16, wherein the bus system includes a primary bus and a secondary bus.

19. The data processing system of claim 16, wherein the processing unit includes a plurality of processors.

20. The data processing system of claim 16, wherein the communications unit is one of a modem and Ethernet adapter.

21. The data processing system of claim 16, wherein the data processing system is one of a desktop computer, a laptop computer, and a personal digital assistant.

22. A data processing system for presenting a menu and a plurality of items associated with the menu, the data processing system comprising:

presenting means for presenting a plurality displayed items within an array in the menu, wherein the displayed items are part of the plurality of items associated with the menu;

displaying means for displaying a graphical indicator in association with the menu, wherein the graphical indicator is representative of which items are displayed within the array; and scrolling means, responsive to user input directed to the menu, for scrolling items within the array wherein previously undisplayed items are displayed within the array and previously displayed items are hidden.

23. The data processing system of claim 22, wherein the graphical indicator is a circle.

24. The data processing system of claim 23, wherein a first portion of the circle identifies the displayed items and a second portion of the circle identifies the undisplayed items.

25. The data processing system of claim 22, wherein the array is a linear array.

26. The data processing system of claim 22, wherein the user input device comprises input from a pointing device positioning over the array, and the pointing device is one of a mouse, keyboard, and trackball.

27. The data processing system of claim 22, wherein the plurality of items are scrolled circularly.

28. The data processing system of claim 22, wherein the plurality of items are scrolled linearly.

29. The data processing system of claim 22, wherein the menu is one of a pull-down menu, a submenu, and a pop-up menu.

30. The data processing system of claim 22, wherein whether the array is scrollable is determined by a total number of the plurality of items.

31. The data processing system of claim 22, further comprising:

executing means for executing a process associated with an item within the plurality of items in response to selection of the item.

32. The data processing system of claim 22, wherein the scrolling means scrolls the items in a first direction if a pointer is located in a first portion of the menu and scrolls the items in a second direction is the pointer is located in a second portion of the menu.

33. The data processing system of claim 22, wherein the graphical indicator is displayed in a first state when circular scrolling occurs and is displayed in a second state when linear scrolling occurs.

34. The data processing system of claim 22, wherein a behavior of the scrolling of the plurality of items within the array occurs is governed by user defined parameters.

35. The data processing system of claim 34, wherein the user defined parameters include at least one of a scrolling speed, a number of displayed items, a selection of initially displayed items.

36. The data processing system of claim 22, wherein the scrolling means includes changing between linear scrolling and circular scrolling in response to a particular user input.

37. A computer program product in a computer readable medium for use in presenting a menu and a plurality of items associated with the menu, the computer program product comprising:

first instructions for presenting a plurality of displayed items within an array in the menu, wherein the displayed items are part of the plurality of items associated with the menu;

second instructions for displaying an graphical indicator in association with the menu, wherein the graphical indicator is representative of which items are displayed within the array; and third instructions, responsive to user input directed to the menu, for scrolling items within the array wherein previously undisplayed items are displayed within the array and previously displayed items are hidden.

* * * * *